(12) United States Patent
Galicia et al.

(10) Patent No.: US 9,348,633 B2
(45) Date of Patent: *May 24, 2016

(54) MULTI-ENVIRONMENT OPERATING SYSTEM

(75) Inventors: Joshua D. Galicia, Cary, IL (US);
Jeffrey C. Carlyle, Grayslake, IL (US);
Andrew N. Tzakis, Vernon Hills, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 524 days.

This patent is subject to a terminal disclaimer.

(21) Appl. No.: 12/838,868

(22) Filed: Jul. 19, 2010

(65) Prior Publication Data

US 2011/0016299 A1  Jan. 20, 2011

Related U.S. Application Data

(60) Provisional application No. 61/226,988, filed on Jul. 20, 2009.

(51) Int. Cl.
| | | |
|---|---|---|
| *G06F 9/00* | (2006.01) | |
| *G06F 9/24* | (2006.01) | |
| *G06F 15/177* | (2006.01) | |
| *G06F 9/455* | (2006.01) | |

(52) U.S. Cl.
CPC .................. *G06F 9/45537* (2013.01)

(58) Field of Classification Search
CPC ....... G06F 9/45537; G06F 9/54; G06F 9/541; H04L 67/1095

USPC .................................. 713/1, 2, 100, 300, 320
See application file for complete search history.

(56) References Cited

U.S. PATENT DOCUMENTS

| | | |
|---|---|---|
| 5,119,494 A | 6/1992 | Garman |
| 5,446,904 A | 8/1995 | Belt et al. |
| 5,592,657 A | 1/1997 | Johnson et al. |
| 5,757,371 A | 5/1998 | Oran et al. |
| 5,828,376 A | 10/1998 | Solimene et al. |
| 6,043,816 A | 3/2000 | Williams et al. |

(Continued)

FOREIGN PATENT DOCUMENTS

| | | |
|---|---|---|
| CN | 101025701 A | 8/2007 |
| CN | 101051282 A | 10/2007 |

(Continued)

OTHER PUBLICATIONS

The Xen Team, "Users' manual Xen v2.0 for x86", University of Cambridge, UK Dec. 31, 2004, 56 pages, XP002638667.*

(Continued)

*Primary Examiner* — Mark Connolly
(74) *Attorney, Agent, or Firm* — McDermott Will & Emery LLP

(57) ABSTRACT

Various embodiments of the present invention provide a mobile computing device that operates multiple, co-existing and independent operating system environments on a common kernel. A booting process for initiating a multiple operating system environment is also provided. Additionally, various embodiments of the present invention include processes for managing a switch between one operating system environment to a second operating system environment.

22 Claims, 12 Drawing Sheets

(56) References Cited

U.S. PATENT DOCUMENTS

| | | | |
|---|---|---|---|
| 6,133,915 | A | 10/2000 | Arcuri et al. |
| 6,167,425 | A | 12/2000 | Beckhoff |
| 6,170,045 | B1 | 1/2001 | Bobak et al. |
| 6,178,503 | B1 | 1/2001 | Madden et al. |
| 6,205,452 | B1 | 3/2001 | Warmus et al. |
| 6,215,490 | B1 | 4/2001 | Kaply |
| 6,336,120 | B1 * | 1/2002 | Noddings et al. . G06F 17/30067 707/829 |
| 6,336,146 | B1 | 1/2002 | Burridge et al. |
| 6,338,149 | B1 | 1/2002 | Ciccone, Jr. et al. |
| 6,460,136 | B1 * | 10/2002 | Krohmer et al. ............. 713/2 |
| 6,691,146 | B1 | 2/2004 | Armstrong et al. |
| 6,710,788 | B1 | 3/2004 | Freach et al. |
| 6,757,002 | B1 | 6/2004 | Oross et al. |
| 6,763,458 | B1 | 7/2004 | Watanabe et al. |
| 7,114,104 | B1 | 9/2006 | Bennett |
| 7,328,333 | B2 * | 2/2008 | Kawano et al. ................ 713/1 |
| 7,363,128 | B2 | 4/2008 | Dietsch et al. |
| 7,424,601 | B2 * | 9/2008 | Xu ................................. 713/1 |
| 7,424,623 | B2 | 9/2008 | Du et al. |
| 7,461,144 | B1 * | 12/2008 | Beloussov et al. ............. 709/223 |
| 7,468,729 | B1 | 12/2008 | Levinson |
| 7,523,738 | B2 | 4/2009 | Ruiz |
| 7,529,921 | B2 * | 5/2009 | Stein et al. ....................... 713/1 |
| 7,533,101 | B2 | 5/2009 | Bond et al. |
| 7,536,537 | B2 | 5/2009 | Linn |
| 7,590,945 | B2 | 9/2009 | Sims et al. |
| 7,595,810 | B2 | 9/2009 | Louch |
| 7,634,770 | B2 * | 12/2009 | Roth ............................ 717/170 |
| 7,636,586 | B2 | 12/2009 | Maanitty et al. |
| 7,681,134 | B1 | 3/2010 | Grechishkin et al. |
| 7,689,820 | B2 * | 3/2010 | Pierce et al. ..................... 713/2 |
| 7,783,665 | B1 * | 8/2010 | Tormasov et al. ............. 707/783 |
| 7,882,274 | B2 | 2/2011 | Peterson |
| 7,975,236 | B1 | 7/2011 | Grechishkin et al. |
| 8,046,570 | B2 | 10/2011 | King et al. |
| 8,177,554 | B2 | 5/2012 | Krasner |
| 8,195,624 | B2 | 6/2012 | Yang |
| 8,261,231 | B1 | 9/2012 | Hirsch et al. |
| 8,307,177 | B2 | 11/2012 | Prahlad et al. |
| 8,352,733 | B2 | 1/2013 | Mantere et al. |
| 8,392,498 | B2 | 3/2013 | Berg et al. |
| 8,396,807 | B1 | 3/2013 | Yemini et al. |
| 8,448,251 | B2 | 5/2013 | Harris et al. |
| 8,589,952 | B2 | 11/2013 | Wong et al. |
| 8,661,360 | B2 | 2/2014 | Jeong et al. |
| 8,868,899 | B2 | 10/2014 | Galicia et al. |
| 8,957,905 | B2 | 2/2015 | Reeves et al. |
| 8,983,536 | B2 | 3/2015 | Gangam et al. |
| 2001/0035882 | A1 | 11/2001 | Stoakley et al. |
| 2002/0078260 | A1 | 6/2002 | Hart et al. |
| 2002/0140742 | A1 | 10/2002 | Lection et al. |
| 2002/0151334 | A1 | 10/2002 | Sharma |
| 2002/0157001 | A1 | 10/2002 | Huang et al. |
| 2003/0065738 | A1 | 4/2003 | Yang et al. |
| 2003/0135771 | A1 * | 7/2003 | Cupps et al. ................. 713/320 |
| 2003/0204708 | A1 | 10/2003 | Hulme et al. |
| 2003/0221087 | A1 * | 11/2003 | Nagasaka ..................... 712/209 |
| 2004/0015966 | A1 | 1/2004 | MacChiano et al. |
| 2004/0039950 | A1 | 2/2004 | Okamoto et al. |
| 2004/0061723 | A1 | 4/2004 | Tai et al. |
| 2004/0066414 | A1 | 4/2004 | Czerwinski et al. |
| 2004/0095388 | A1 * | 5/2004 | Rocchetti et al. ............. 345/763 |
| 2004/0111644 | A1 | 6/2004 | Saunders et al. |
| 2004/0148375 | A1 | 7/2004 | Levett et al. |
| 2004/0205755 | A1 | 10/2004 | Lescouet et al. |
| 2004/0207508 | A1 | 10/2004 | Lin et al. |
| 2005/0086650 | A1 | 4/2005 | Yates et al. |
| 2005/0108297 | A1 | 5/2005 | Rollin et al. |
| 2005/0125739 | A1 | 6/2005 | Thompson et al. |
| 2005/0229188 | A1 | 10/2005 | Schneider |
| 2005/0240756 | A1 | 10/2005 | Mayer |
| 2005/0240763 | A9 | 10/2005 | Bhat et al. |
| 2005/0246505 | A1 | 11/2005 | McKenney et al. |
| 2005/0268078 | A1 | 12/2005 | Zimmer et al. |
| 2006/0005187 | A1 | 1/2006 | Neil |
| 2006/0010314 | A1 | 1/2006 | Xu |
| 2006/0010446 | A1 | 1/2006 | Desai et al. |
| 2006/0026274 | A1 | 2/2006 | Cho et al. |
| 2006/0046706 | A1 | 3/2006 | Lin et al. |
| 2006/0224989 | A1 | 10/2006 | Pettiross et al. |
| 2006/0225107 | A1 | 10/2006 | Seetharaman et al. |
| 2006/0253706 | A1 | 11/2006 | Roberts et al. |
| 2007/0050765 | A1 * | 3/2007 | Geisinger ......................... 718/1 |
| 2007/0128899 | A1 | 6/2007 | Mayer |
| 2007/0135043 | A1 | 6/2007 | Hayes et al. |
| 2007/0150842 | A1 | 6/2007 | Chaudhri et al. |
| 2007/0162298 | A1 | 7/2007 | Melton et al. |
| 2007/0180398 | A1 | 8/2007 | McArdle |
| 2007/0192329 | A1 | 8/2007 | Croft et al. |
| 2007/0198656 | A1 | 8/2007 | Mazzaferri et al. |
| 2007/0226647 | A1 | 9/2007 | Louch |
| 2007/0266231 | A1 | 11/2007 | Chua |
| 2007/0283147 | A1 * | 12/2007 | Fried et al. ..................... 713/167 |
| 2007/0288941 | A1 | 12/2007 | Dunshea et al. |
| 2007/0294689 | A1 | 12/2007 | Garney |
| 2008/0028326 | A1 | 1/2008 | Wilson et al. |
| 2008/0034318 | A1 | 2/2008 | Louch et al. |
| 2008/0082815 | A1 | 4/2008 | Kawano et al. |
| 2008/0100568 | A1 | 5/2008 | Koch et al. |
| 2008/0114844 | A1 | 5/2008 | Sanchez et al. |
| 2008/0162983 | A1 | 7/2008 | Baba et al. |
| 2008/0256468 | A1 | 10/2008 | Peters et al. |
| 2008/0270910 | A1 | 10/2008 | Lukasik et al. |
| 2008/0276195 | A1 | 11/2008 | Moromisato et al. |
| 2008/0282205 | A1 | 11/2008 | Dykstra-Erickson et al. |
| 2008/0307350 | A1 | 12/2008 | Sabatelli et al. |
| 2008/0307360 | A1 | 12/2008 | Chaudhri et al. |
| 2009/0031329 | A1 * | 1/2009 | Kim ............................... 719/327 |
| 2009/0037909 | A1 | 2/2009 | Xu |
| 2009/0063845 | A1 * | 3/2009 | Lin ................................ 713/100 |
| 2009/0064186 | A1 | 3/2009 | Lin |
| 2009/0080562 | A1 | 3/2009 | Franson |
| 2009/0089569 | A1 * | 4/2009 | Baribault et al. ................ 713/2 |
| 2009/0158299 | A1 | 6/2009 | Carter |
| 2009/0193074 | A1 | 7/2009 | Lee |
| 2009/0199122 | A1 | 8/2009 | Deutsch et al. |
| 2009/0199219 | A1 | 8/2009 | Rofougaran et al. |
| 2009/0235200 | A1 | 9/2009 | Deutsch et al. |
| 2009/0241072 | A1 | 9/2009 | Chaudhri et al. |
| 2009/0276771 | A1 | 11/2009 | Nickolov et al. |
| 2009/0287571 | A1 | 11/2009 | Fujioka |
| 2009/0327917 | A1 | 12/2009 | Aron et al. |
| 2009/0328033 | A1 | 12/2009 | Kohavi et al. |
| 2010/0064251 | A1 | 3/2010 | Hufnagel et al. |
| 2010/0077347 | A1 | 3/2010 | Kirtane et al. |
| 2010/0097386 | A1 | 4/2010 | Kim et al. |
| 2010/0107115 | A1 | 4/2010 | Sareen et al. |
| 2010/0138515 | A1 | 6/2010 | Ruiz-Velasco et al. |
| 2010/0192149 | A1 | 7/2010 | Lathrop et al. |
| 2010/0211769 | A1 * | 8/2010 | Shankar et al. .................. 713/2 |
| 2010/0217912 | A1 | 8/2010 | Rofougaran et al. |
| 2010/0245037 | A1 | 9/2010 | Davis et al. |
| 2010/0313156 | A1 | 12/2010 | Louch et al. |
| 2010/0313165 | A1 | 12/2010 | Louch et al. |
| 2010/0319008 | A1 | 12/2010 | Ho |
| 2010/0333088 | A1 | 12/2010 | Rogel et al. |
| 2010/0333100 | A1 | 12/2010 | Miyazaki et al. |
| 2011/0016301 | A1 * | 1/2011 | Galicia et al. .................... 713/2 |
| 2011/0022993 | A1 | 1/2011 | Ohno et al. |
| 2011/0054879 | A1 | 3/2011 | Bogsanyl et al. |
| 2011/0055602 | A1 | 3/2011 | Kamay et al. |
| 2011/0066984 | A1 | 3/2011 | Li |
| 2011/0093691 | A1 * | 4/2011 | Galicia et al. .................... 713/1 |
| 2011/0093836 | A1 * | 4/2011 | Galicia et al. .................... 713/2 |
| 2011/0119610 | A1 | 5/2011 | Hackborn et al. |
| 2011/0126216 | A1 * | 5/2011 | Galicia et al. ................ 717/139 |
| 2011/0138295 | A1 | 6/2011 | Momchilov et al. |
| 2011/0138314 | A1 | 6/2011 | Mir et al. |
| 2011/0144970 | A1 | 6/2011 | Jiang et al. |
| 2011/0179387 | A1 | 7/2011 | Shaffer et al. |
| 2011/0246786 | A1 | 10/2011 | Laor et al. |
| 2012/0036450 | A1 | 2/2012 | Canton |
| 2012/0041570 | A1 | 2/2012 | Jones et al. |

(56) References Cited

U.S. PATENT DOCUMENTS

| | | | |
|---|---|---|---|
| 2012/0042159 A1* | 2/2012 | Liu | 719/318 |
| 2012/0081353 A1 | 4/2012 | Yusupov et al. | |
| 2012/0081380 A1 | 4/2012 | Reeves et al. | |
| 2012/0083264 A1 | 4/2012 | Ramasamy et al. | |
| 2012/0084542 A1* | 4/2012 | Reeves et al. | 713/1 |
| 2012/0084791 A1* | 4/2012 | Benedek et al. | 718/102 |
| 2012/0102495 A1* | 4/2012 | Gangam et al. | 713/2 |
| 2012/0150970 A1 | 6/2012 | Peterson et al. | |
| 2012/0151372 A1 | 6/2012 | Kominac et al. | |
| 2012/0173741 A1 | 7/2012 | Brittain et al. | |
| 2012/0173986 A1 | 7/2012 | Jung | |
| 2012/0174021 A1 | 7/2012 | Dharawat | |
| 2012/0192100 A1 | 7/2012 | Wang et al. | |
| 2012/0227058 A1 | 9/2012 | Hunt et al. | |
| 2012/0278747 A1 | 11/2012 | Abraham et al. | |
| 2012/0278750 A1 | 11/2012 | Abraham et al. | |
| 2012/0304092 A1 | 11/2012 | Jarrett et al. | |
| 2013/0160013 A1 | 6/2013 | Pires et al. | |
| 2013/0212283 A1 | 8/2013 | Wang et al. | |
| 2013/0293573 A1 | 11/2013 | Wolfe et al. | |
| 2013/0298140 A1 | 11/2013 | Wolfe et al. | |
| 2013/0298141 A1 | 11/2013 | Wolfe et al. | |
| 2013/0311682 A1 | 11/2013 | Barat et al. | |

FOREIGN PATENT DOCUMENTS

| | | |
|---|---|---|
| CN | 101149685 A | 3/2008 |
| CN | 101203842 A | 6/2008 |
| CN | 101382833 A | 3/2009 |
| CN | 101615123 A | 12/2009 |
| CN | 101697181 A | 4/2010 |
| EP | 1059582 A2 | 12/2000 |
| EP | 1688816 A1 | 8/2006 |
| GB | 2369959 A | 12/2000 |
| JP | H 07-121336 A | 5/1995 |
| JP | 2009157802 A | 7/2009 |
| WO | 2007035611 A2 | 3/2007 |
| WO | WO-2010/148306 A1 | 12/2010 |
| WO | WO-2011/060382 A1 | 5/2011 |
| WO | WO-2012/012865 A1 | 2/2012 |
| WO | WO-2012/148881 A1 | 11/2012 |
| WO | WO-2012/148885 A1 | 11/2012 |

OTHER PUBLICATIONS

An Overview of Virtualization Techniques, Jun. 4, 2009, www.virtuatopia.com/index.php/AnOverview_of_Virtualization_Techniques.*
U.S. Appl. No. 12/839,069, filed Jul. 19, 2010, "System and Method for Switching Between Environments in a Multi-Environment Operating System"; 29 pages.
U.S. Appl. No. 12/838,668, filed Jul. 19, 2010, "System and Method for Initiating a Multi-Environment Operating System"; 29 pages.
U.S. Appl. No. 12/838,984, filed Jul. 19, 2010, "Multi-Environment Operating System", 43 pages.
U.S. Appl. No. 12/839,193, filed Jul. 19, 2010, "Multi-Environment Operating System", 48 pages.
Kernel (computing) from Wikipedia; http://en.wikipedia.org/wiki/Kernal_(computer_science); 18 pages, printed Jun. 5, 2009.
Ubuntu from Wikipedia; http://en.wikipedia.org/wiki/ubuntu; 12 pages, printed Jun. 5, 2009.
Ubuntu Mobile; http://en.wikipedia.org/wiki/ubuntu_mobile; 2 pages, printed Jun. 5, 2009.
Patent Cooperation Treaty, "PCT Search Report and Written Opinion of the International Searching Authority" for International Application No. PCT/US2010/042516 Jul. 11, 2011, 12 pages.
Patent Cooperation Treaty, "PCT Invitation to Pay Additional Fees and, Where Applicable, Protest Fee" for International Application No. PCT/US2010/042526 Jun. 24, 2011, 7 pages.
Baentsch M. et al., "Mote Runner: A Multi-Language Virtual Machine for Small Embedded Devices", 2009 Third International Conference on Sensor Technologies and Applications, IEEE, Piscataway, NJ, USA, Jun. 18, 2009, 10 pages.
United States Patent and Trademark Office, Non-Final Office Action for U.S. Appl. No. 12/839,069 dated Sep. 10, 2012, 12 pages.
United States Patent and Trademark Office, Non-Final Office Action for U.S. Appl. No. 12/838,984 dated Mar. 28, 2013, 16 pages.
Hassan, "Ubiquitous computing and android," Digital Information Management, Third International Conference, Piscataway, NJ, Nov. 13, 2008, pp. 166-171.
Prosecution History from U.S. Appl. No. 12/838,984, dated from Aug. 17, 2010 through Jun. 27, 2014, 47 pp.
Invitation to Pay Additional Fees from counterpart International Application No. PCT/US2010/042526, dated Jun. 24, 2011, 7 pp.
International Search Report and Written Opinion from counterpart International Application No. PCT/US2010/042526, dated Feb. 21, 2013, 15 pp.
Invitation to Pay Additional Fees from corresponding International Application No. PCT/US2010/042513, dated Jun. 24, 2011, 6 pp.
International Search Report and Written Opinion from corresponding International Application No. PCT/US2010/042513, dated Feb. 21, 2013, 15 pp.
International Preliminary Report on Patentability from corresponding International Application No. PCT/US2010/042513, dated Mar. 7, 2013, 10 pp.
The State Intellectual Property Office of the People's Republic of China, Notification of First Office Action Chinese Patent Application No. 201080032324.3 dated Dec. 26, 2013, 18 papes.
Turner, D., "Introducing Android 1.5 NDK, Release 1", Jun. 25, 2009, 4 pages.
Casadevall, et al., "Android Execution Environment," retrieved from <https://wiki.ubuntu.com/Specs/AndroidExecutionEnvironment>, Apr. 28, 2009, 5 pages.
Android Central Forums: Getting Started with Android—Tips and Tricks, http://forums.androidcentral.com/general-help-how/31622-getting-started-android-tips-tricks.html, Sep. 2010, excerpted 41 pages.
The Sun Babelfish Blog, "why Apple Spaces is Broken," Nov. 2007, blogs.oracle.com/bblfish/entry/why_apple_spaces_is_broken, 24 pages.
Citrix: Go ToAssist Corporate Remote Support Made Easy, www.gotoassist.com, Fact Sheet, 10.8.10/B-27141/PDF, 2010, Citrix Online LLC.
Citrix: Go ToAssist Corporate Remote Support Made Easy, www.gotoassist.com, Product Overview, 4.21.10/B-26651/PDF 2010, Citrix Online LLC.
Citrix: Go ToAssist Express Remote Support Made Easy, www.gotoassist.com, Fact Sheet, 9.27.10/B-21307/PDF, 2010, Citrix Online LLC.
Dormon: Motorola Atrix Lapdock, http://www.theregisterco.uk/Print/2011/08/19/accessory_of_the_week_motorola_atrix_lapdock, Aug. 2011, 8 pages.
D'SA, "Run Android apps on Windows," Nov. 2011, http://tech2.in.com/how-to/apps/run-android-apps-on-windows/259042.
EGL 1.0 Specification, published Jul. 23, 2003.
Getting Started with VMware Fusion for Mac OS X, VMware, item EN-000189-00, copyright 2007-2009, VMware, Inc.
Herrman: VMWare For Mobile Devices Lets you Run Windows and Android Simultaneously, http://gizmodo.com/5160685/vmware-for-mobile-devices-lets-you-run-windows-and-android-simultaneously/all, Feb. 2009, 2 pages.
Kobie, "Vmware demos mobile virtualisation," Feb. 2009, http://itpro.co.uk/609992/vmware-demos-mobile-virtualisation.
Martin: iTunes 9.0.2 Improves App Sorting, http://reviews.cnet.com/8301-19512_7-10387022-33.html?tag=contentMain;contentBody;1n, Oct. 2009, 5 pages.
Nakajima, et al., "Composition Kernel: A multicore Processor Virtualization Layer for Rich Functional Smart Products," Software Technologies for Embedded and Ubiquitous Systems, Oct. 2010, pp. 227-238.
Parallels: Parallels Workstation, http://www.parallels.com/products/workstation/, downloaded Dec. 28, 2012.

(56) References Cited

OTHER PUBLICATIONS

Paul, "Canonical developers aim to make Android apps run on Ubuntu," May 2009, http://arstechnica.com/gadgets/2009/05-canonical-developerss-aim-to-make-android-apps-run-on-ubuntu/.
Payne, et al. "Lares: An Architecture for Secure Active Monitoring Using Virtualization," IEEE Symposium on Security and Privacy, May 2008, pp. 233-247.
Payne, et al. "Secure and Flexible Monitoring of Virtual Machines," Computer Security Applications Conference, Dec. 2007, pp. 385-397.
Ramananthan: Ubuntu For Android: The Complete Story, http://www.muktware.com/2012/02/ubuntu-for-andriod-the-complete-story/2553, Feb. 2012, 5 pages.
Richardson, et al., "Virtual Network Computing," IEEE Internet Computing, IEEE Service Center, Jan. 1998, vol. 2, No. 1, pp. 33-38.
Tubbs, "Windows Live Mesh 2011 and SkyDrive Synced Storage woven together nicely; still a few loose threads," posted Oct. 29, 2010, http://www.wysiwygmedia.com/reviews/ windows-live-mesh-2011-and-skydrive-synced-storage-woven-together-nicely-still-a-few-loose-threads.wm.
"Ubuntu Linux Rocks!!" published Nov. 15, 2009, http://maxtheitpro.com/ubuntu-linux-rocks.
Vmware: VMware Workstation 7 Product FAQs, downloaded Apr. 18, 2011.
VMware Workstation 7, The Gold Standard in Desktop Virtualization, Product Datasheet, 2009, www.vmware.com.
Whitwam: Everything You Need to Know about Ubunto for Android; http://www.tested.com/tech/android/3627-everything-you-need-to-know-about-ubuntu-for-android/, Feb. 2012, 5 pages.
Codecoffee, "How to compile & execute C programs under Linux (Absolute basics)," Oct. 2009, retrieved from http://www.codecoffee.com/tipsforlinux/articles/18.html.
Maker, "A Survey on Android vs Linux," University of California 2009, pp. 1-10.
Meier "Professional Android 2 Application Development," Aug. 2010, retrieved from http://esys.ir/files/ref_books/android/esys.ir_professional%20android%202%20application%20development.pdf.
Wikipedia "Comparison of X Window System desktop environment," Jan. 2009, retrieved from http://en.wikipedia.org/wiki/Comparison_of_X_Window_System_desktop_environments.
Wikipedia "GNU C Library," Nov. 2009, retrieved from http://en.wikipedia.org/wiki/GNU_C_Library 4 pages.
Wikipedia "POSIX," Apr. 2009, retrieved from http://en.wikipedia.org/wiki/POSIX, 5 pages.
Wikipedia "Taskbar" retrieved from http://en.wikipedia.org/wiki/Taskbar dated Feb. 24, 2010; 7 pages.
Wikipedia "X Window System," Jan. 2009, retrieved from http://en.wikipedia.org/wiki/X_window_system, 11 pages.
Gelchlik, "How to Lock Your Computer with Bluetooth Proximity Lock Utility," Apr. 2010, http://www.makeuseof.com/tag/lock-windows-computer-bluetooth-proximity-lock-utility/.
Mac OS X Hints, "Lock and unlock a Mac using Bluetooth detection," Dec. 2009, http://hints.macworld.com/article.php?story=20091221173111783.
Ubuntu forums, "Howto: Use BlueProximity and your cellphone for security," Feb. 2008, http://ubuntuforums.org/showthread.php?t=702372.
Webtop Application, archived Apr. 29, 2011, 6 pages, retrieved from https://web.archive.org/web/20110429011220/http://www.motorola.com/support/us-en/consumer-support/software/webtop_application.

\* cited by examiner

MULTI-ENVIRONMENT OPERATING SYSTEM

CROSS-REFERENCE TO RELATED APPLICATIONS

This application claims the benefit of U.S. Provisional Patent Application No. 61/226,988, titled "Multi-Environment Operating System" and filed on Jul. 20, 2009.

FIELD OF THE INVENTION

The present invention relates generally to operating systems and methods for initiating an operating system boot sequence. More specifically the present invention relates to multi-environment operating systems and methods for booting multi-environment operating systems.

BACKGROUND OF THE INVENTION

Operating systems are designed and typically optimized based on specific applications and user desired performance. It is often desirable to have features of one type of operating system available to another operating system, as user preferred programs can be operating system dependant.

General-purpose computer operating systems such as Linux™ and Windows™ have an extensive set of features such as file systems, device drivers, applications, libraries, etc. Such operating systems allow concurrent execution of multiple programs, and attempt to optimize the response time (also referred to as latency time), and CPU usage, or load, associated to the servicing of the concurrently executing programs. Unfortunately, however, such operating systems are not generally suitable for embedded real-time applications, such as for mobile computing devices. Under certain circumstances it would be desirable for a mobile computing device to have the performance associated with a mobile-specific embedded operating system and features of a general-purpose operating system.

Linux, for example, is a well known general purpose desktop operating system with many desirable features for modern devices including modern operating systems features, numerous development tools, networking, etc. However, Linux was not designed to be an embedded or real time operating system. Many modern devices, such as, without limitation, set top boxes, mobile phones and car navigation systems require not only the features of a general purpose operating system such as Linux, but also the features of an embedded or real time operating system, including real time performance.

Historically, running multiple operating environments on a single device has been accomplished through virtualization techniques, such as, by example, VMware™, VirtualBox™, QEMU™, etc. However, when using virtualization a complete computer is emulated and one or more software stacks are operated in the emulated computing device. Emulation is wrought with high overhead costs.

In view of the foregoing, there is a need for a system implementing a single-kernel environment that efficiently and conveniently provides the performance and features of co-existing, independent operating systems.

BRIEF SUMMARY OF THE INVENTION

In accordance with at least one embodiment of the present invention, a mobile device operating system having a core kernel configured to interface a device hardware component and a middleware component is provided. The system includes at least two co-existing independent middleware operating environments coupled to the core kernel, the middleware operating environments each having a corresponding application component.

According to another embodiment of the invention, a mobile computing device having a memory storage unit coupled to a computer processor is provided. The memory storage unit includes computer executable instructions capable of operating at least two operating system environments on a common kernel According to yet another alternative embodiment, a mobile telephone having a graphical user interface configured to receive and transmit multimedia information is provided. The telephone includes a computing system with a processor coupled to a memory storage unit, and a multi-environment operating system having a common kernel. The memory storage unit includes computer executable instructions capable of managing resources shared between at least two co-existing independent operating system environments.

In accordance with an alternative embodiment, the present invention includes a mobile computing device with a computer processor coupled to a computer memory having computer executable instructions configured to initiate an operating system. The device also includes an operating system configured to simultaneously run a standard Linux distribution operating system environment and an Android™ operating system environment on a single kernel.

According to yet another alternative embodiment, the invention includes a mobile device operating system having a core kernel configured to interface a device hardware component and a middleware component. The device also includes a first independent middleware operating environment configured to run JAVA-interpreted applications and coupled to the core kernel, and a second independent middleware operating environment configured to run native applications and coupled to the core kernel.

DETAILED DESCRIPTION

It is envisioned that it would be advantageous to have an embedded operating system and a Linux-based operating environment communicate directly with a single Linux kernel running directly upon a computing device's hardware.

Figure 1:
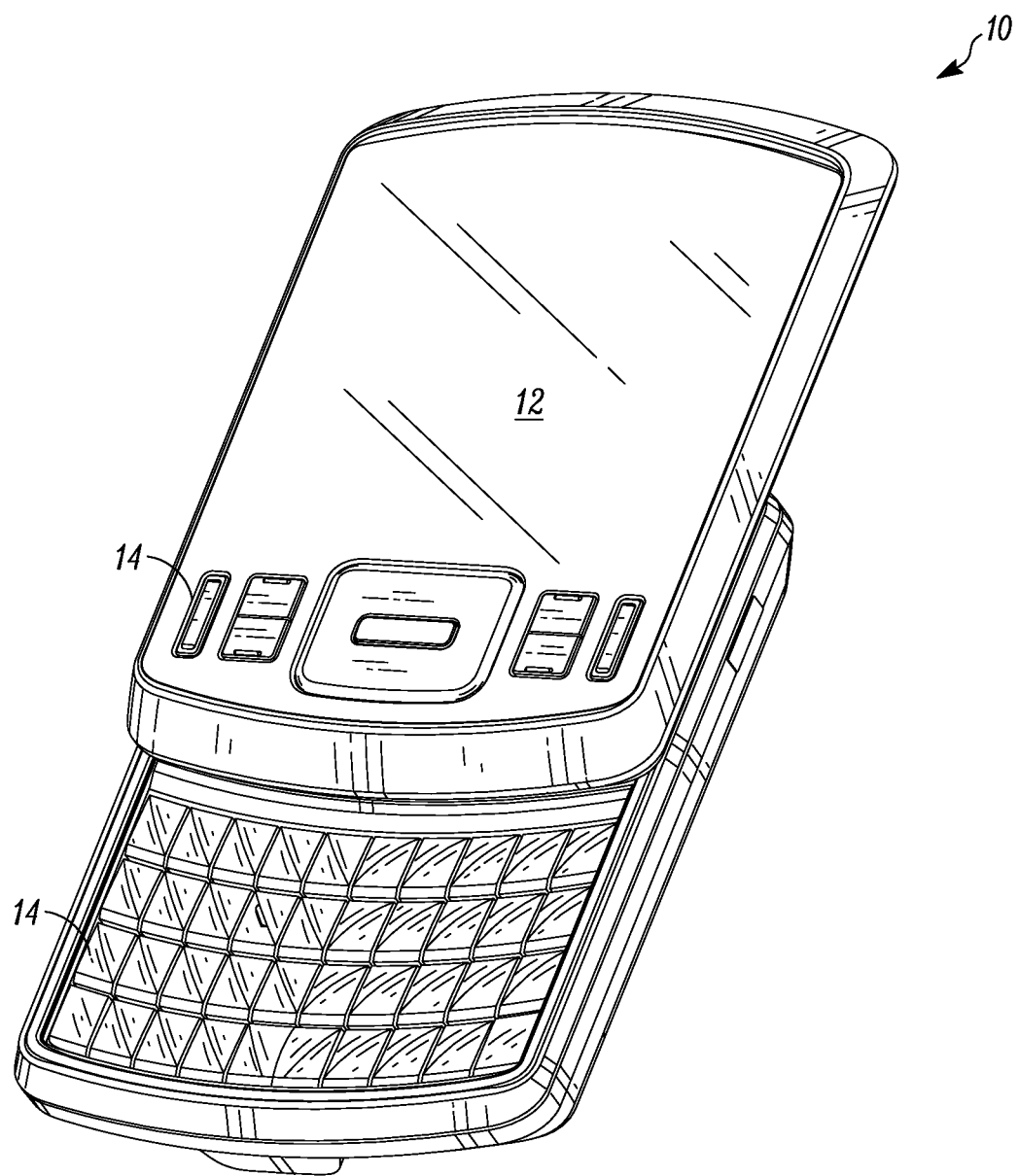
FIG. 1 is an exemplary perspective view of a mobile device.

Referring to FIG. 1, a mobile telephone 10 is provided. The telephone 10 includes a GUI 12 and a plurality of data input buttons 14. The mobile device 10 is selected from the group including, but not limited to, a mobile personal computer (PC), a netbook, a mobile telephone, a laptop computer, a handheld computer and a smart phone. Although the device 10 is mobile, it is intended to have significant computing power, with a processor speed in excess of 500 mHz, although slower processors are not excluded. Considering the computing power, a user can connect the device 10 to a variety of peripheral devices (not shown). The peripheral devices are selected from a group including, but not limited to, computer monitor, a laptop computer, a desktop computer, a tablet PC, and a screen projector.

Figure 2:
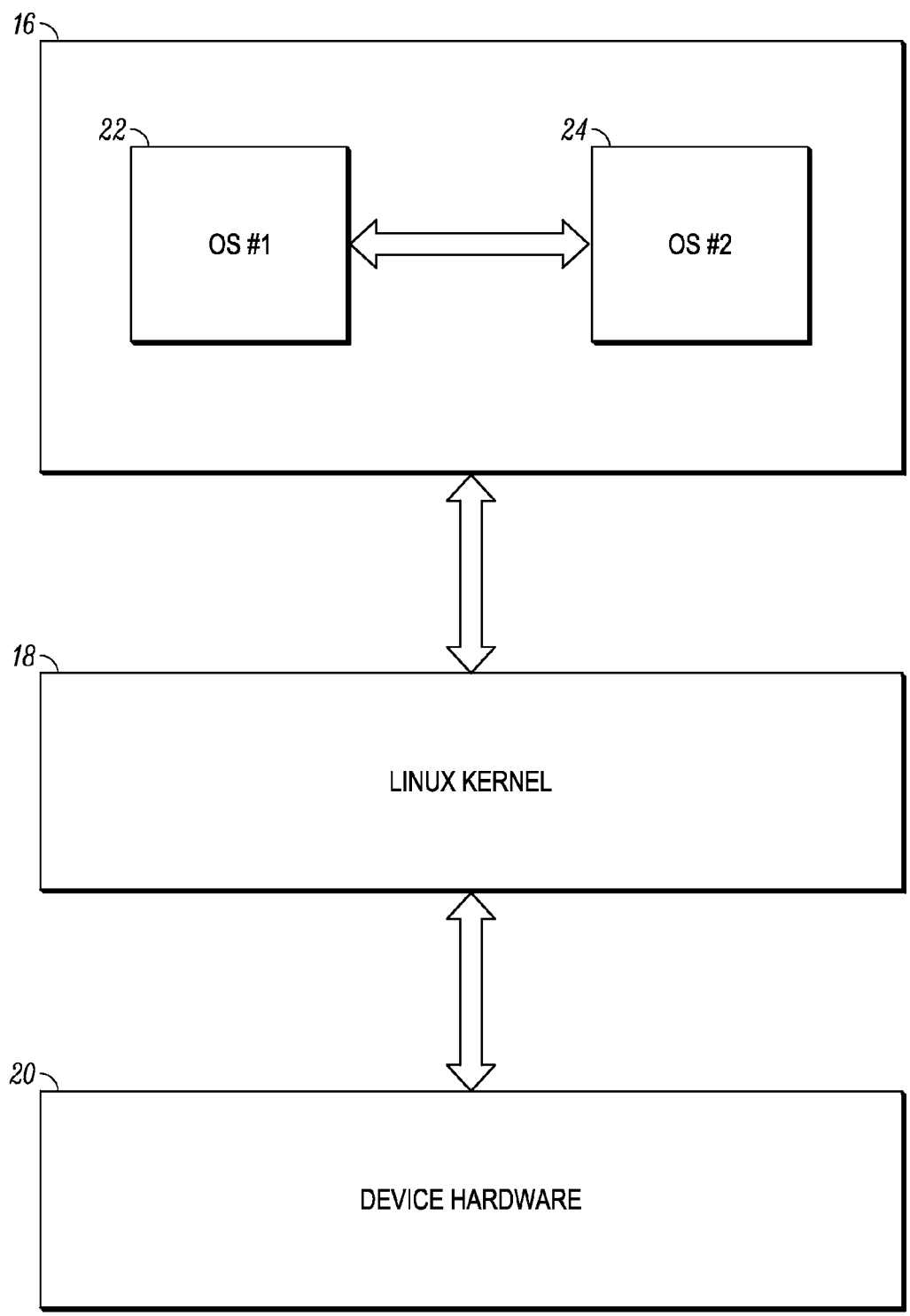
FIG. 2 is a block diagram representing an exemplary operating system.

Now referring to FIG. 2, a block diagram of an exemplary operating system (OS) 16 in communication with a kernel 18 is provided. The OS 16 can be a Linux distribution system, a Linux-based operating system or a non-Linux-based operating system. The device hardware 20 is also in communication with the Linux kernel 18. The operating system 16 includes a first operating system environment 22 and a second operating system environment 24 in communication with a single Linux kernel 18. By example, the second middleware operating system environment 24 is a standard Linux distribution and the first middleware operating system environment 22 is an embedded operating system environment intended for use in mobile devices, such as an Androie™ (Open Handset Alliance, www.openhandsetalliance.com) operating system. A Linux distribution 16 is in communication with the Linux kernel 18, which is in communication with the device hardware 20. The device hardware 20 can be a memory storage device (not shown) coupled to a processor (not shown) which stores computer executable instructions which are configured to perform various functions and operations, as described herein.

An exemplary operating system 16 includes Ubuntu® (Canonical Ltd., www.ubuntu.com) for the Linux-based operating system environment 24. It is specifically intended that multiple middleware operating system environments co-exist independent of the other(s). Exemplary environments that can be included in operating system 16 include Android™, Ubuntu® (Canonical Ltd., www.ubuntu.com), standard Linux-based environments, Symbian (Symbian Foundation Ltd., www.symbian.com), and Windows-based environments. In an alternative embodiment, it is envisioned that greater than two operating system environments are configured to independently co-exist on the same core kernel 18.

Figure 3:
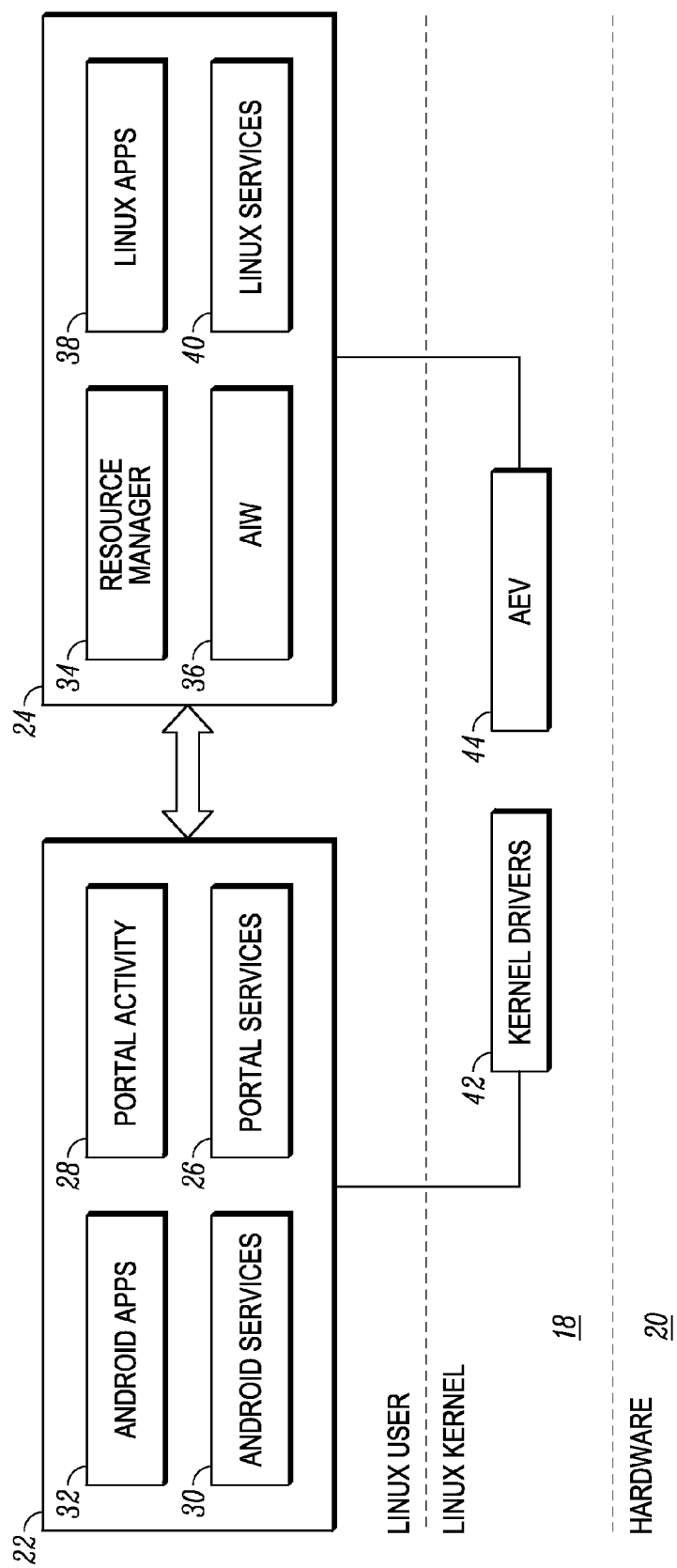
FIG. 3 is a block diagram of an exemplary operating system.

Referring to FIG. 3, a block diagram of an exemplary operating system is provided. In the present exemplary embodiment, the first OS environment 22 is an Android™ based operating environment and the second OS environment 24 is Linux-based. The first operating system environment 22 includes a portal service module 26, a portal activity module 28, a OS services module 30 and an OS applications module 32. The second operating system environment 24 includes a resource manager 34, an Android in a window (AIW) module 36, a second OS applications module 38 and a second OS services module 40.

The AIW module 36 is configured to display a first OS 22 application window on the GUI 12 while the second OS 24 is the primary operating environment.

The portal service module 26 contains a set of instructions configured to allow service for the first OS 22 and directs all communication with the resource manager 34. While the device 10 is operating the portal service module 26 is preferably running at all times. Additionally, the portal service module 26 is connected to activity associated with the portal activity module 28, as well as first OS 22 broadcast events. The portal activity module 28 is an application, or set of computer executable instructions, which represents a second OS 24 application located on the first OS 22 stack. By example, if the second OS 24 is Ubuntu® the portal activity module 28 can represent a specific Ubuntu application, and when the portal activity module 28 has focus, Ubuntu is in view through the GUI 12. Numerous applications can run simultaneously, also referred to as a stack of running applications, within any given operating environment. Logically speaking, the topmost application is deemed to have "focus".

The kernel 18 includes a set of drivers 42 and an AEV module 44. Included with the drivers 42 are input device drivers for hardware components 20. The AEV 44 is a kernel module that takes absolute coordinate and keyboard events from AIW 36 and passes them to an event hub.

The co-existing environments within operating system 16 communicate with each other. The resource manager 34, which is part of the second OS 24, communicates directly with the portal service module 26, which is part of the first OS 22. Furthermore, the portal service module 26, which is part of the first OS 22, communicates directly with the resource manager 34. The resource manager 34 is a set of instructions configured to manage the resources shared by the first OS 22 and second OS 24. The shared resources include display devices, input devices, power management services and system state information. Furthermore, the resource manager 34 is configured to control OS 22,24 access to the hardware 20. Additionally, the resource manager 34 identifies and controls which OS 22, 24 user interface is displayed through the GUI 12.

According to the present embodiment, the portal service 26 is the source of all communications from the first OS 22 to the resource manager 34. Additionally, the portal service 26 is a sink for all callbacks from the resource manager 34 to the first OS 22. The resource manager provides a status discoverable application programming interface (API) to the portal service 26. This API is configured to be called by the resource manager 34 at any time. The resource manager 34 is configured to obtain and process runtime status, which allows for the resource manager to maintain a state machine. For the first OS 22, the portal service 26 provides runtime status to processes that require them. Similarly, the portal service 26 requests and receives status updates from processes which provide status information. A similar communication for the second OS 24 is controlled by the resource manager 34, which provides runtime status to the processes that require them. Resource manager 34 requests and receives status updates from various processes that provide status information. Device drivers 42 logically associated with the kernel 18 communicate directly with the resource manager 34 as well as the processes that provide runtime status information. By example, the API arbitrates access to user interface devices, such as displays, touch screens or the GUI 12. Yet another example, the API arbitrates access to power input devices, such as batteries and/or AC/DC wall plugs.

The first OS 22 and the second OS 24 are independent from the other, and co-exist with respect to the other. Each OS 22, 24 is a fully functioning operating system environment, and does not need the other operating system environment to function. The two operating system environments exist on the same device 10 with 100% independence with respect to the other. As identified above, the first and second OS 22, 24 do not co-exist in a virtualization or emulation scheme, but in fact operate on a single kernel 18. Instead, there is runtime co-existence in which both OS 22, 24 run in their respective native environments and neither OS 22, 24 is recompiled, as there is no need to leverage a common C runtime environment. Applications can be accessed by a user which are coded purely for one or the other OS 22, 24 without an interruption to a user's computing experience.

Figure 4:
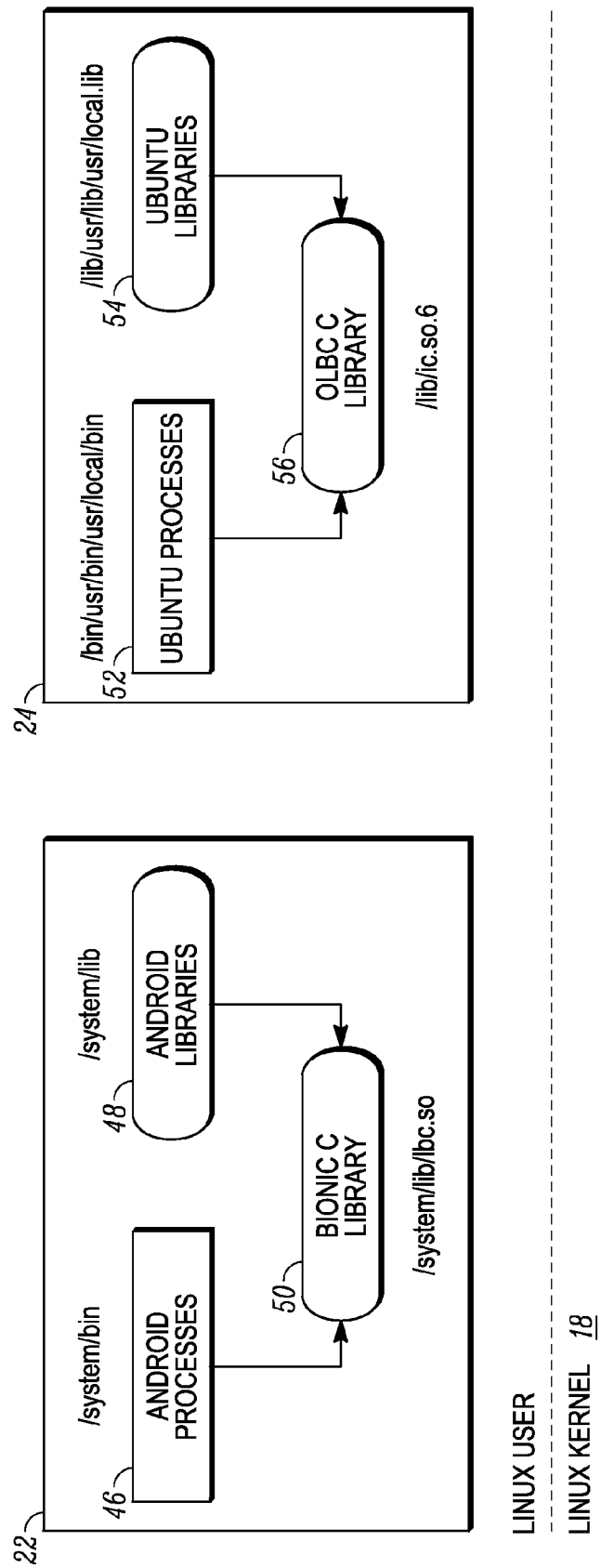
FIG. 4 is a block diagram of a runtime co-existence schema of an exemplary operating system.

Referring to FIG. 4, a block diagram provides an exemplary co-existence scheme for an Android® OS 22 and an Ubuntu™ OS 24. Each OS 22, 24 operates on a separate runtime environment, which provides software services for programs and/or processes while the device 10 is operating. Android processes 46 and Android libraries 48 access a Bionic C Library 50, which is optimized and modified specifically for the Android environment. Ubuntu processes 52 and Ubuntu libraries 54 access a Glibc C Library 56, which is a GNU C library used in many standard desktop Linux-based systems. Each OS environment runs on its respective C libraries without conflicting another operating environment.

Figure 5:
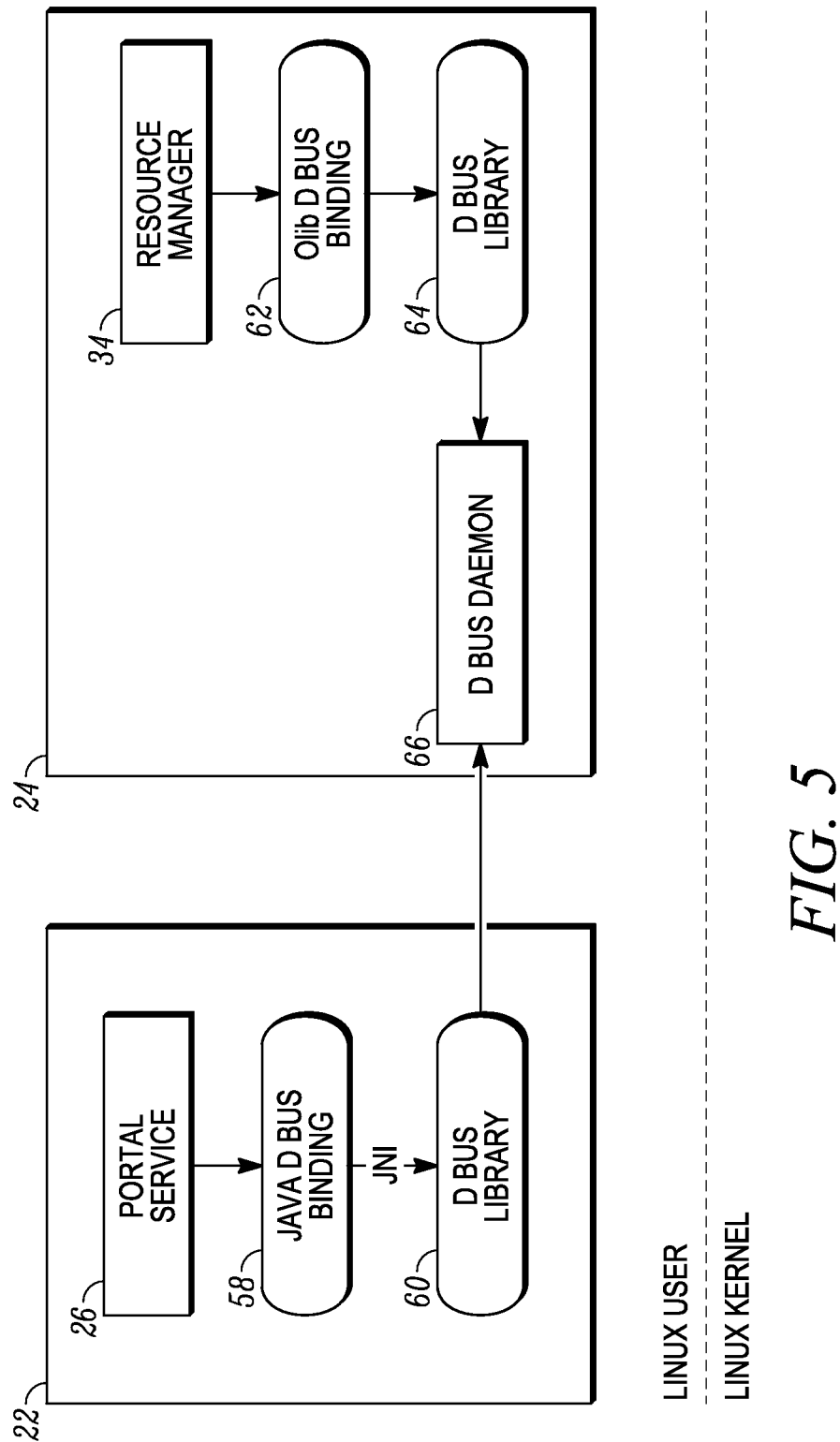
FIG. 5 is block diagram of a inter-environment communication schema of an exemplary operating system.

Referring to FIG. 5, a more detailed communication path between the first OS 22 and the second OS 24 described in FIG. 4 is provided. An inter-process communication (IPC) system is configured to manage the inter-environment communication flow between the first OS 22 and the second OS 24. The portal service 26 communicates with a DBUS Binding 58, which is a software package containing programming language and executable instructions configured to communicate with a DBUS library 60. The resource manager 34 communicates with a Glib DBUS binding 62, which also is a software package containing programming language and executable instructions configured to communicate with a DBUS library 64 configured for the second OS 24. Both the first OS 22 DBUS library 60 and the second OS 24 library 64 communicate through a DBUS Daemon 66, which is logically part of the second OS 24, and acts as the communication link between the two operating environments.

Figure 6:
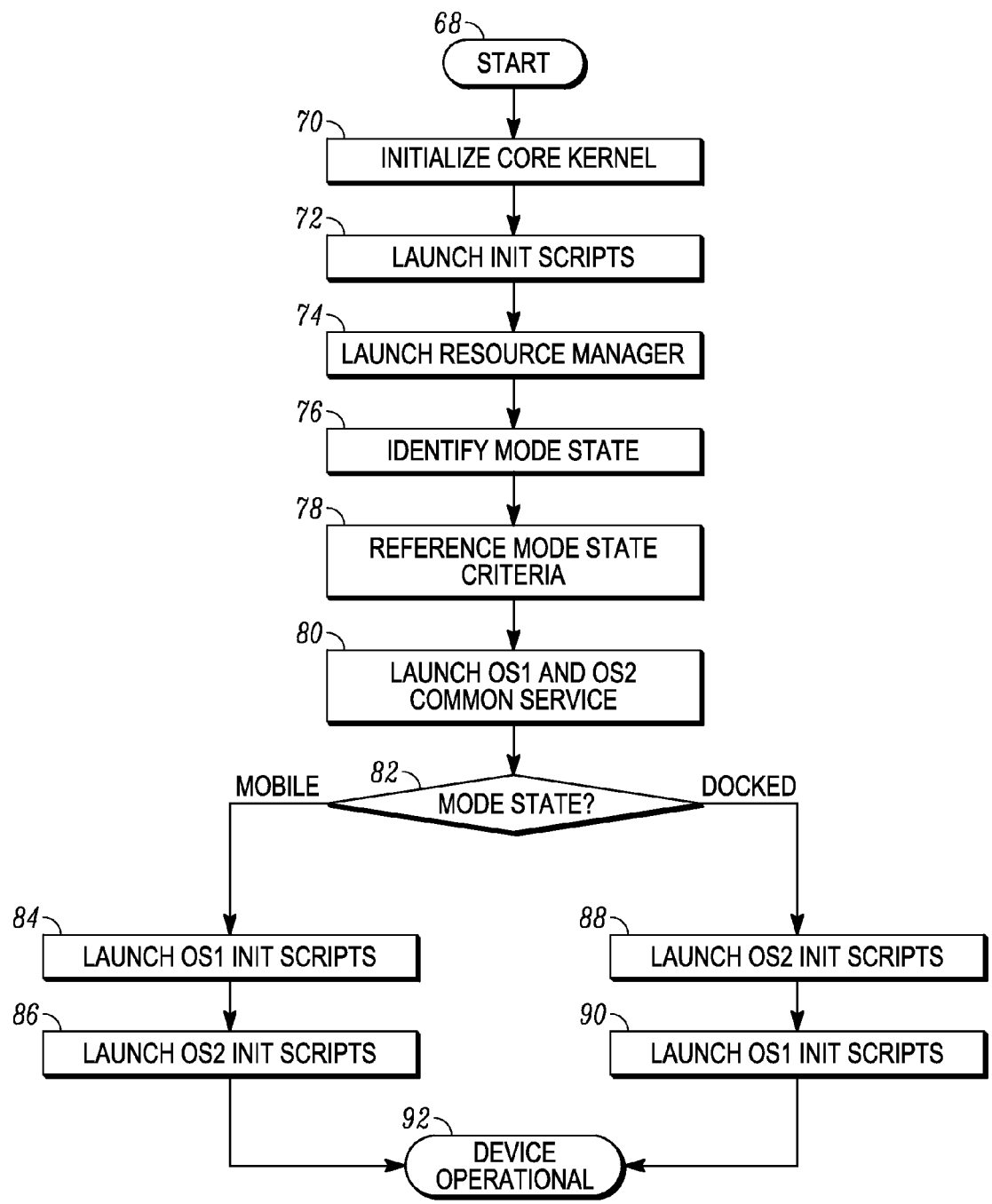
FIG. 6 is a flow chart identifying steps in a booting sequence for an exemplary operating system.

Referring to FIG. 6, a flow chart representing a boot sequence is provided. The boot sequence includes both common and operating system environment-specific steps. The actual boot sequence is dependent upon rules associated with a predetermined device state that dictates the booting sequence. By example, if the device is connected to a peripheral device, such as a monitor, the device state is considered to be in docked mode, and the second OS 24 is the default primary environment. Alternatively, if the device 10 is not connected to a peripheral device, then it is in mobile mode, and the first OS 22 is the default primary operating environment. However, the secondary operating environment is launched simultaneously with the primary environment, and operates in the background in case the device 10 state changes and the secondary environment is switched to become the primary environment. By example, when the device 10 is in docked mode and the peripheral device is unplugged, there is an automatic switch to mobile mode, which results in the secondary environment becoming the primary environment, and vice versa.

The boot sequence is initiated at step 68, followed by launching the core Linux kernel 18 at step 70. A bootloader program initializes prior to launching the kernel. After the Linux kernel 18 is initialized, the kernel launches user space scripts at step 72. The resource manager 34 is launched at step 74, followed by identifying the mode state at step 76. Once the mode state is identified a reference library is accessed at step 78 to determine the criteria associated with and/or dictated by the mode state that is identified. At step 80, the services common to both the first OS 22 and the second OS 24 are launched. The mode state determined at step 76 is referenced at step 82. If the mobile state is identified then the first OS 22 is the primary operating environment, then the first OS initialization scripts are launched at step 84, followed by the second OS initialization scripts launched at step 86. If the docked state is referenced at step 82, then the second OS 24 is the primary operating environment, and then the second OS 24 initialization scripts are launched at step 88 followed by launching the first OS 22 initialization scripts at step 90. Regardless of which environment is the primary, both environments are launched and running before the device 10 is operational at step 92. Since the common services are launched first at step 80, for all intents and purposes the primary and secondary environments are launched in parallel. However, the primary environment-specific services, based upon the device state, are launched immediately before the secondary environment-specific services. By separating the common services launch with the environment-specific launch, the device 10 can be quickly operational with multiple co-existing and independent operating environments.

Figure 7:
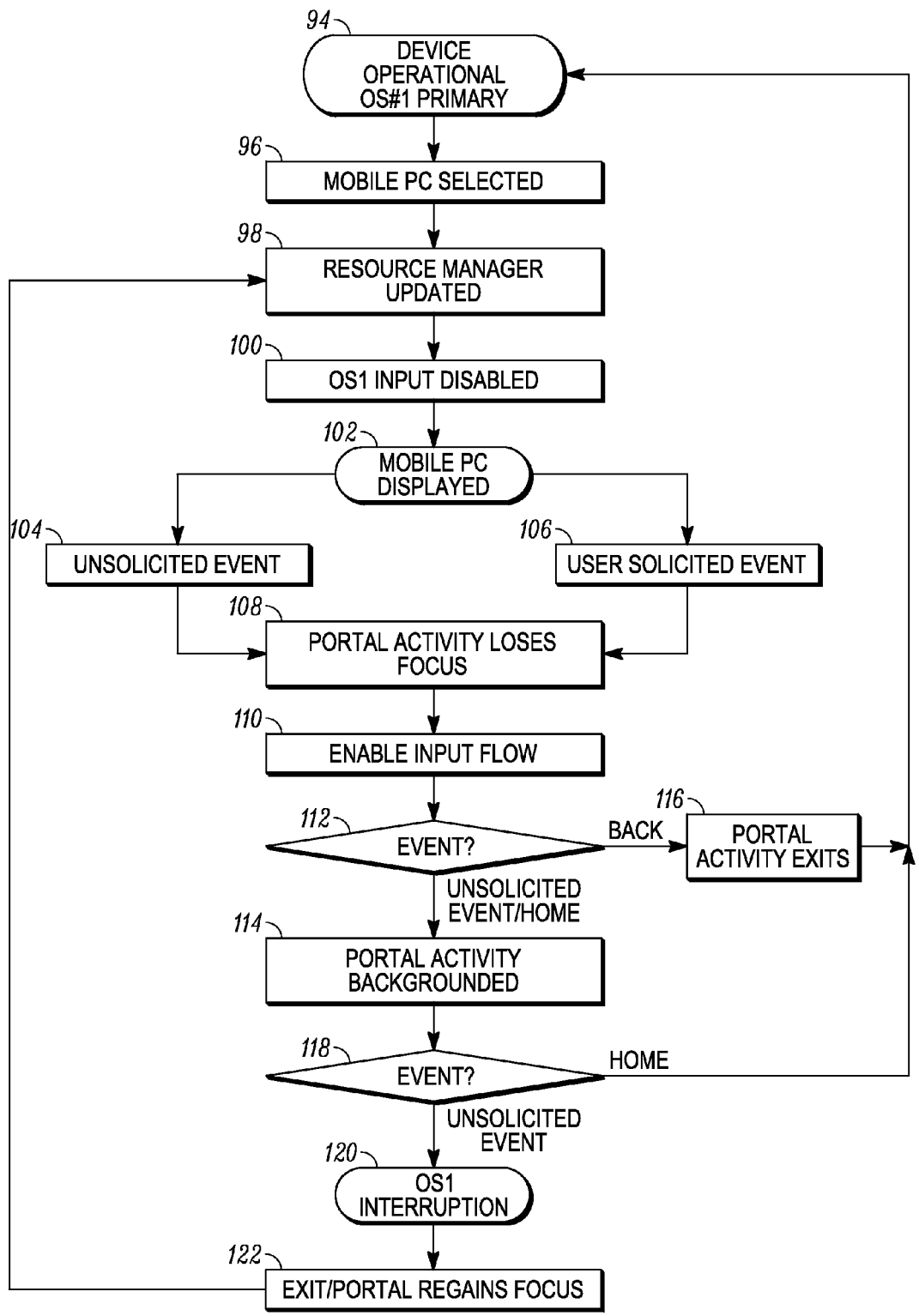
FIG. 7 is a flow chart identifying exemplary steps for launching an application in a first operating environment while an exemplary operating system is controlled by a second operating environment.

Referring to FIG. 7, a flow chart identifying steps for launching a second OS 24 application while the device 10 is in mobile mode 94 and the first OS 22 has primary control. A second OS 24 application, Mobile PC, is selected at step 96. Mobile PC is an application in the first OS 22 which provides a full PC view, alternatively referred to as a netbook view, while the device 10 is operating in mobile mode and the first OS 22 is in primary control. In an alternative embodiment, individual applications from the second OS 24 can be listed in a first OS 22 menu and individually launched, which can be similar to a netbook view.

The portal service 26 sends a status update communication to the resource manager 34 at step 98 indicating that the portal activity 28 has gained focus. Thereafter, the resource manager 34 disables the first OS 22 input and switches a virtual terminal at step 100. The mobile PC application is displayed on the GUI 12 at step 102. While operating the mobile PC application an unsolicited event can occur at step 104 or a user-solicited event can occur at step 106. Unsolicited events include time critical and non-time critical events. By example, a time critical unsolicited event includes a phone call or a scheduled or unscheduled alarm. Furthermore, by example, a non-time critical unsolicited event includes a SMS message, an email message or a device update notification. After an event 104, 106 occurs the portal service 26 sends a communication to the resource manager 34 indicating that the portal activity 28 has lost focus at step 108. At step 110, the resource manager 34 requests the first OS 22 to enable input event flow and switches the virtual terminal. By example, the present embodiment includes separate virtual terminals for switching display control between the first OS 22 and the second OS 24. Broadly speaking, a virtual terminal is a Linux application that allows a system user to switch display controls between Windows based view and a system console.

When an unsolicited event occurs or a user selects the "Home" key at step 112, the portal activity 28 is switched to the background at step 114 while the unsolicited event continues or the user operates another application from the "Home" menu of the GUI 12. Alternatively, if the user selects the "Back" key at step 112, then the portal activity 28 exits the application and the device 10 reverts to the idle main menu at step 94. User-initiated events, such as selecting the Home key, Back key, or initiating a new application are exemplary solicited events. When an event occurs a decision is made at step 118, and the first OS 22 is interrupted at step 120 if the event is an unsolicited event. Alternatively, if the event is a solicited event, such as the user selecting the "Home" key, then the device reverts to the idle main menu at step 94. After the OS interruption at step 120, the interrupting application exits and the portal activity 28 regains focus at step 122 and the device 10 reverts to step 98.

In an alternative embodiment, the virtual terminal facility is not utilized. Rendering a second OS 24 application while in the mobile mode can be accomplished through a VNC-like application. The second OS 24 application, such as Ubuntu, can be rendered remotely into the VNC client. Additionally, this embodiment doesn't take physical display control away from the first OS 22.

In yet another alternative embodiment, non time-critical notifications generated by the first OS 22 are identified and listed in a panel within the second OS 24 view. By listing the notifications in a panel the first. OS 22 status information is integrated with the second OS 24 view when the second OS 24 is the primary OS. At the user's leisure, the panel is accessed to reveal non time-critical status notifications. When the panel is engaged the first OS 22 becomes the primary OS and allows the notifications to be viewed. By example, the panel can be a pull-down list that comes down from a status area with a slide gesture.

Figure 8:
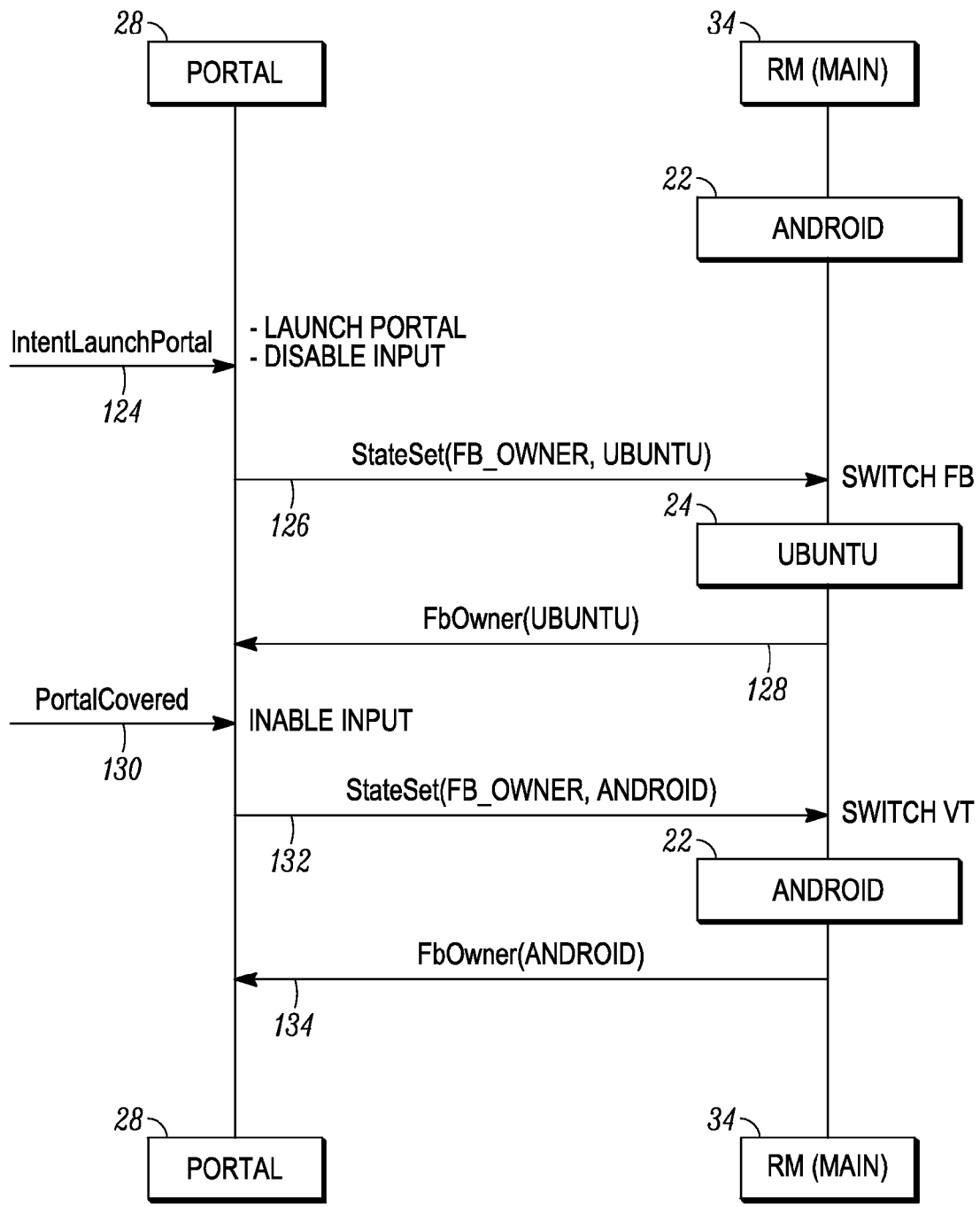
FIG. 8 is a message sequence chart identifying exemplary steps for launching a second operating environment application while a first operating environment has primary control.

Referring to FIG. 8, a message sequence chart identifying the steps for launching a second OS 24 application while the first OS 22 has primary control is provided. The sequence chart provides a step wise flow, from top to bottom, of the signals transmitted between the portal activity module 28 and the resource manager 34. The portal activity 28 receives a signal 124 to launch the portal and disable the input. The first OS 22 has primary control before signal 126 changes the mode state to the second OS 24 obtaining primary control. Signal 126 is sent from the portal activity 28 to the resource manager 34, which then generates a responsive signal 128 sent to the portal activity 28 indicating that the second OS 24 is the primary OS. Signal 130 is received by the portal activity 28 and enables the input. Signal 132 is sent from the portal activity 28 to the resource manager 34 changing the mode state of from the second OS 24 to the first OS 22. After receiving signal 132 the resource manager 34 switches the virtual terminal. The resource manager 34 then sends a status update signal 134 to the portal activity 28 indicating that the first OS 22 is primary.

Figure 9:
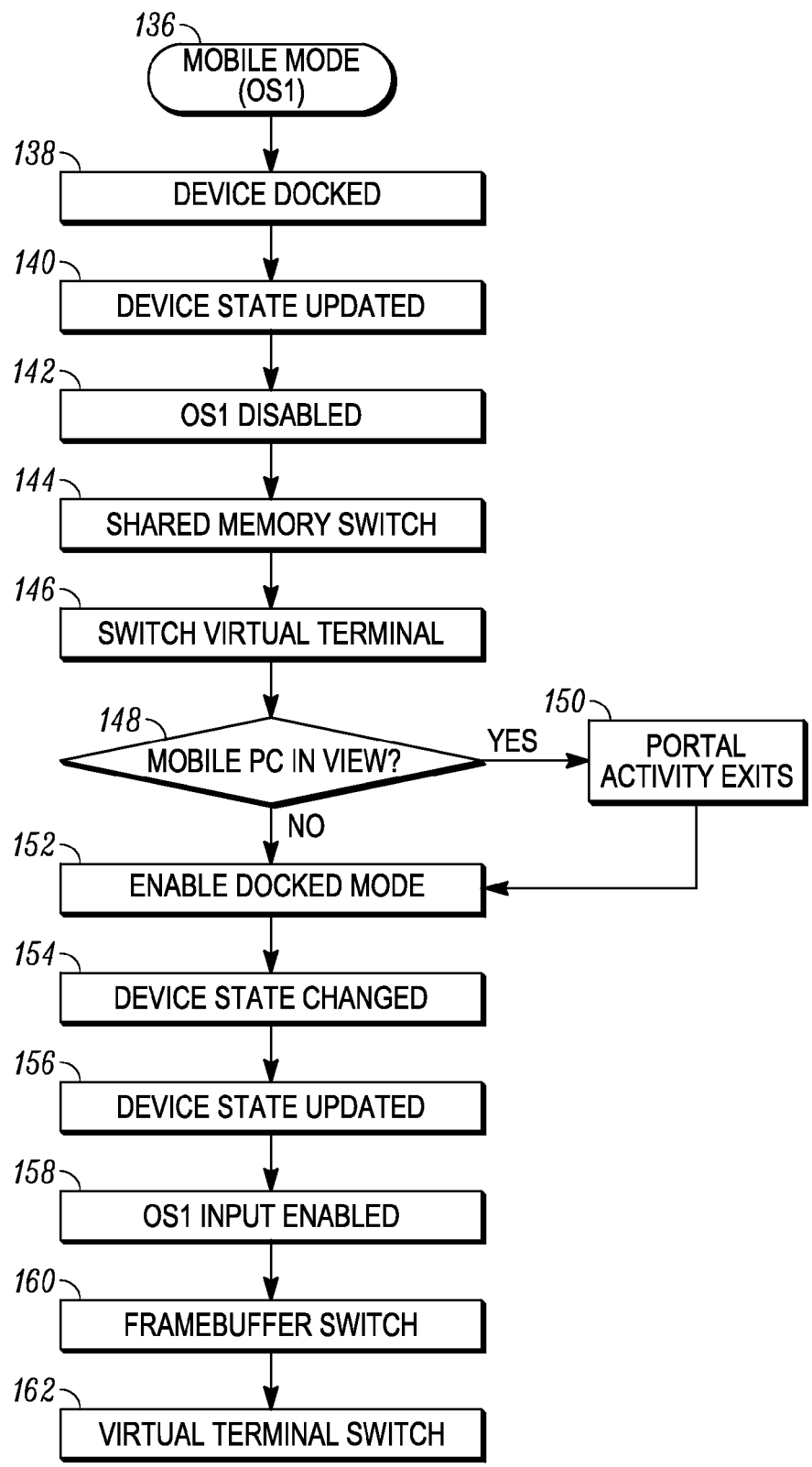
FIG. 9 is a flow chart identifying exemplary steps associated with switching from a first operating environment to a second operating environment.

Referring to FIG. 9, a flow chart identifying steps associated with switching from a first operating environment to a second operating environment is provided. The device 10 is idle in the mobile mode (OS1 22) at step 136. At step 138 the device 10 is connected to a docking station, or connected to a peripheral device. By example, an HDMI connection can be established between the device 10 and a monitor or a television. The resource manager 34 is notified of the updated connection status at step 140 and the first OS 22 is disabled at step 142 in response to the connection status change. The first OS 22 portal switches the shared memory framebuffer at step 144, followed by the resource manager 34 switching the virtual terminal at step 146. If the Mobile PC application is in view at step 148, then the portal activity 26 exits at step 150. Alternatively, if the Mobile PC application is not in view, then the docked mode is enabled at step 152. In the event that the device state changes at step 154, then the resource manager 34 receives a status state update at step 156. By example, the state of the system changes when a user removes an HDMI cable, or similar connector, which is used for connecting the device 10 to a peripheral device. Following an event state update 156, the first OS 22 is enabled 158 and the device operates in mobile mode. A framebuffer switch is requested at step 160 and a virtual terminal switch is requested at step 162, both of which are performed by the portal activity 26. Following step 162, the device reverts to an idle state in the mobile mode 136.

Figure 10:
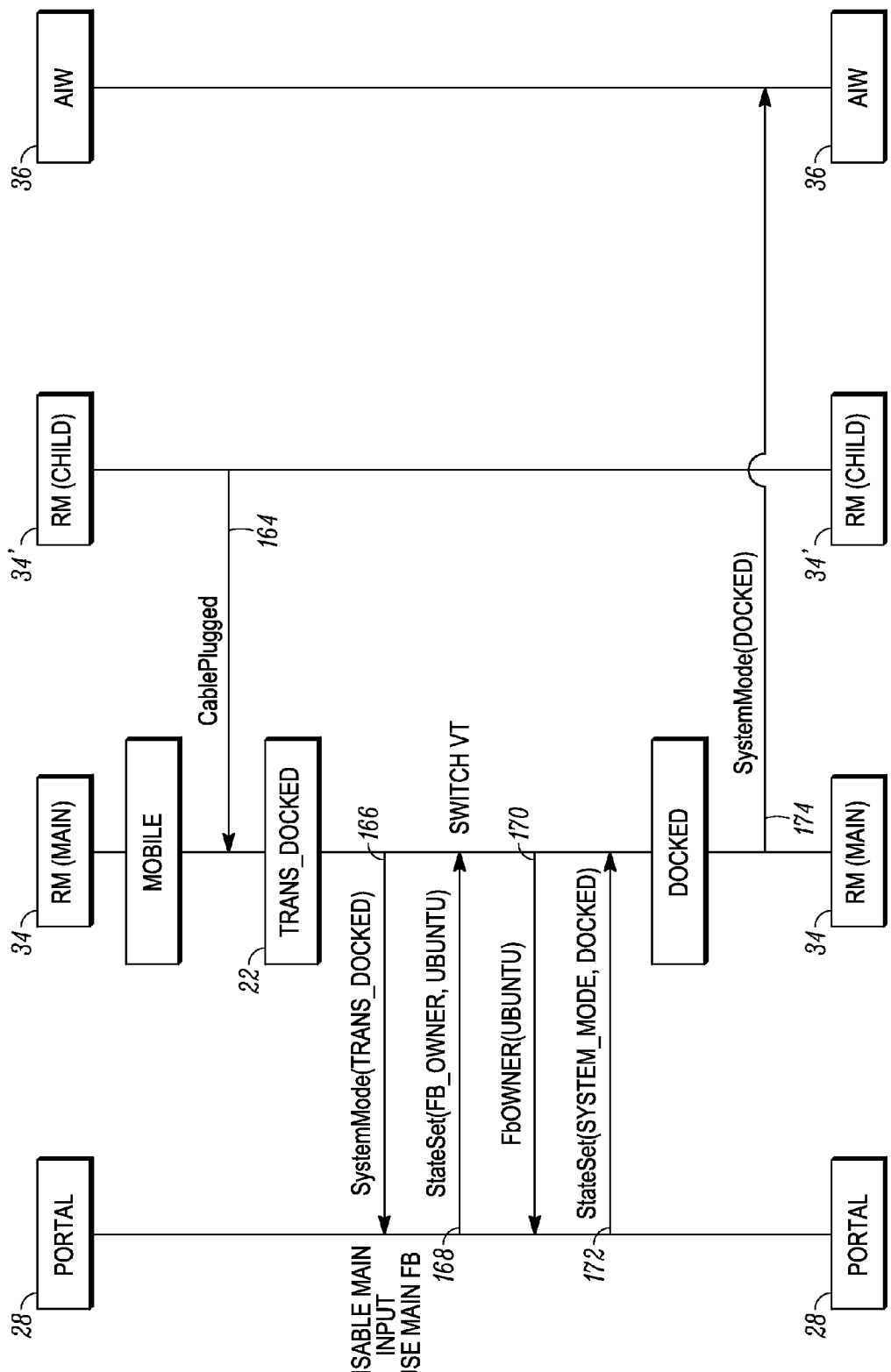
FIG. 10 is a message sequence chart identifying exemplary steps for switching from a first operating environment to a second operating environment.

Referring to FIG. 10, a message sequence chart identifying the steps performed when the device 10 transitions from mobile mode (OS1) to docked mode (OS2) is provided. The device 10 is operating in mobile mode and the first OS 22 is the primary OS. A cable signal 164 is received by the resource manager 34, which indicates that an HDMI or alternate hardwire plug has been attached to the device 10. The cable signal 164 is an exemplary mode state initialization change signal. In an alternative embodiment, the plug can be wireless communication between the device 10 and a peripheral device, and disabling the wireless communication would cause a mode state initialization change signal to be generated. A sequence of signals transitioning the device from mobile mode to docked mode is initiated. Signal 164 is sent from the resource manager 34 to the portal activity 28 indicating a mode status transition and disabling the main data input. The portal activity 28 sends signal 168 to the resource manager 34 identifying the second OS 24 is now primary and switching the virtual terminal. Signal 170 is sent from the resource manager 34 to the portal activity identifying the second OS 24 as the primary and has taken ownership of the framebuffer. A mode state change confirmation signal 172 is sent from the portal activity 28 to the resource manager 34 identifying that the device is now in docked mode and that the second OS 24 is the primary OS. A system mode update signal is sent from the resource manager 34 to AIW 36.

Figure 11:
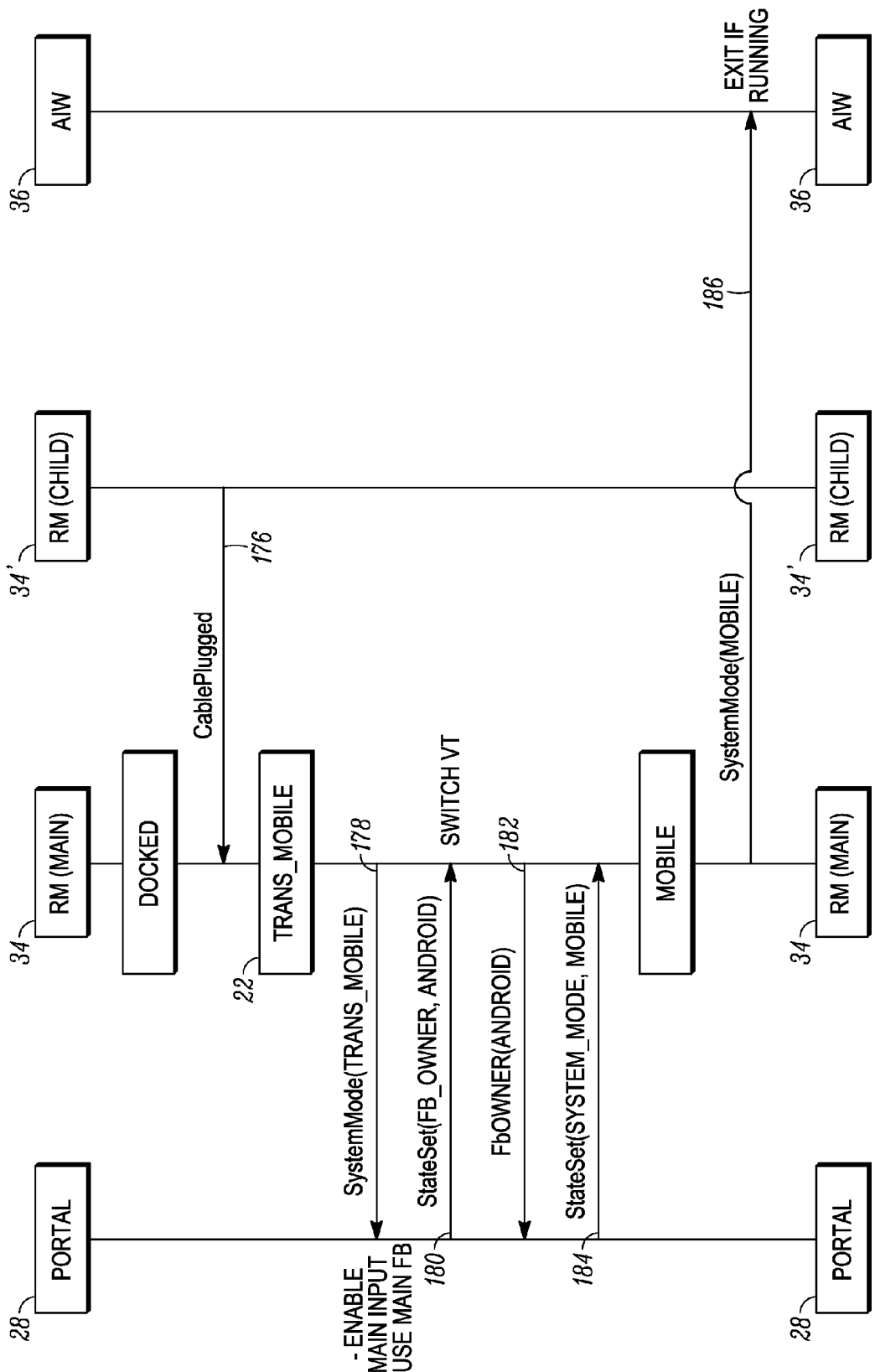
FIG. 11 is a message sequence chart identifying exemplary steps for switching from a second operating environment to a first operating environment.

Referring to FIG. 11, a message sequence chart identifying the steps performed when the device 10 transitions from docked mode (OS2) to mobile mode (OS1) is provided. A cable signal 176 is received by the resource manager 34, which indicates that an HDMI or alternate hardwire plug has been removed from the device 10. Removal of the plug indicates that a peripheral device (not shown) is no longer in communication with the device 10. In an alternative embodiment, the plug can be wireless communication between the device 10 and a peripheral or alternate device (not shown). A sequence of signals transitioning the device from docked mode to mobile mode is initiated. Signal 178 is sent from the resource manager 34 to the portal activity 28 indicating a mode status transition and enabling the main data input and the main framebuffer. The portal activity 28 sends signal 180 to the resource manager 34 identifying the first OS 22 is now primary and switching the virtual terminal. Signal 182 is sent from the resource manager 34 to the portal activity identifying the first OS 22 as the primary and has taken ownership of the framebuffer. A mode state change confirmation signal 184 is sent from the portal activity 28 to the resource manager 34 identifying that the device is now in mobile mode and that the first OS 22 is the primary OS. A system mode update signal is sent from the resource manager 34 to AIW 36.

Figure 12:
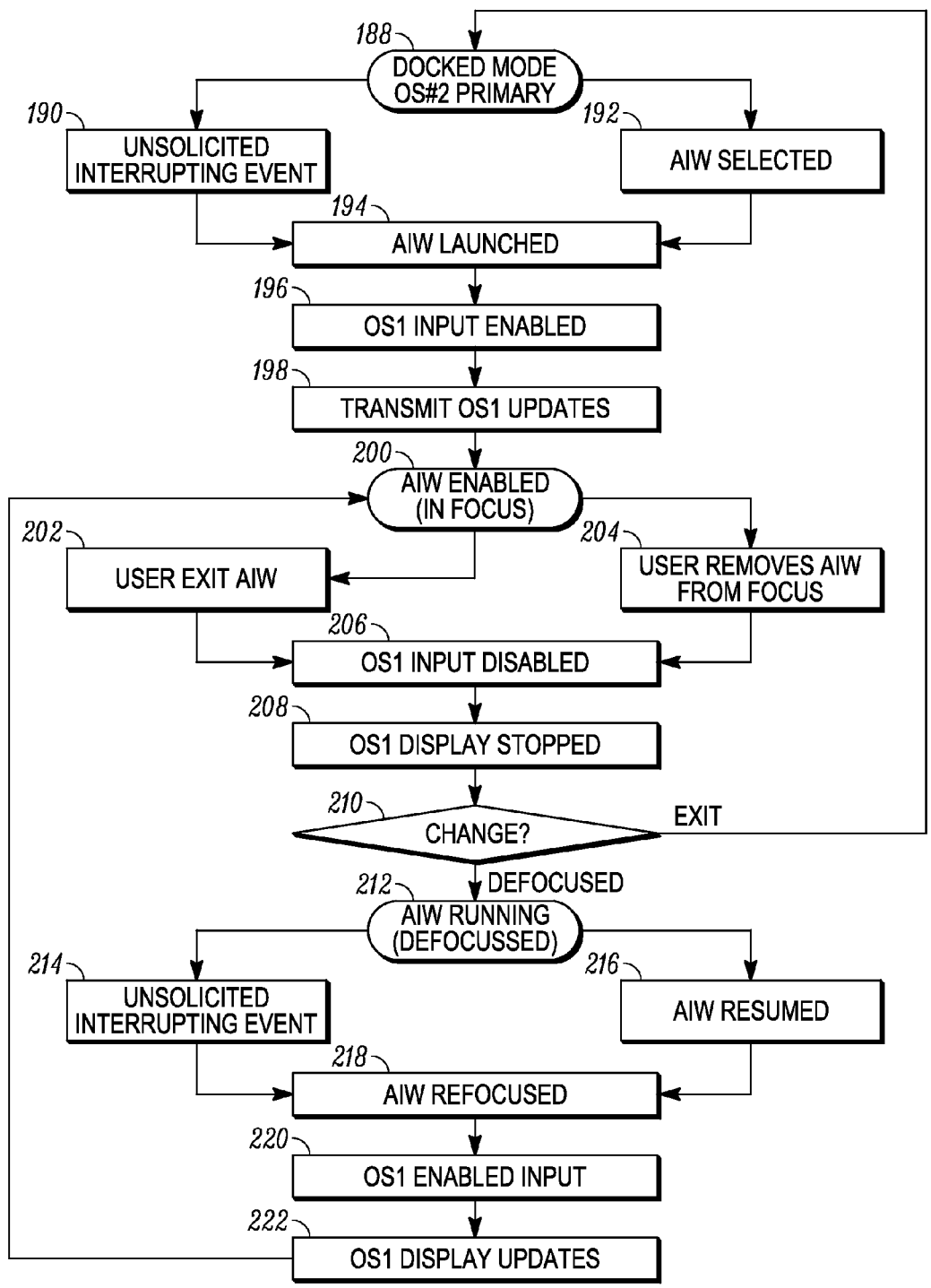
FIG. 12 is a flow chart identifying exemplary use of an application controlled by a first operating environment while a second operating environment has primary control of a computing device.

Referring to FIG. 12, the device 10 is idle in docked mode and the second OS 24 is the primary operating environment at step 188. If an unsolicited event occurs at step 190 or the user selects the OS1 22 in a window application at step 192, then the OS1 22 in a window application is launched at step 194.

By example, if Android is the mobile operating environment 22, then the Android in a Window (AIW) application is launched. The AIW application enables a user to access Android applications while the device is operating in the docked mode. The resource manager 34 is also notified of the status update at step 194. Input to the first OS 22 is enabled at step 196, followed by the transmission of first OS display update notifications at step 198. The AIW application is operating and has focus at step 200. If the AIW application is exited at step 202 or a user removes AIW from focus at step 204, then the first OS 22 input is disabled at step 206. The first OS 22 display is stopped at step 208. If the AIW application is exited at step 210, then the system reverts to the idle docked mode 188. Alternatively, if the AIW application is defocused then the application operates in this state at step 212. In the event of an unsolicited event at step 214 or a solicited interaction with the AIW application at step 216, the AIW regains focus at step 218. While the AIW is defocused a user can select the AIW application and continue interaction with the AIW window, which refocuses the AIW and notifies the resource manager 34 of the status update. After the AIW regains focus the first OS 22, which is Android for the present embodiment, input is enabled at step 220. The first OS 22 display update notifications are transmitted to the resource manager 34 at step 222, followed by the system reverting to step 200, where AIW is enabled and in focus. When an application is in focus, that application is at the logical top of a stack of running applications.

In an alternative embodiment, it is contemplated that the device 10 can transition between mode states based upon events other than docking or undocking the device 10. By example, if the device 10 is stationary for a preset period of time the device 10 can be programmed to operate in the most energy efficient mode state, regardless of the device status otherwise. In yet another example, a user can transition the mode state from docked to mobile even if the device has a connection with a peripheral device. Additionally, the type of peripheral device connected to the device 10 can dictate whether an automatic mode state change sequence is initiated or a user is provided a mode state change request. The user thereby being able to select the mode state in which to operate the device 10. In yet another alternative embodiment, additional mode states are contemplated based upon the particular device 10 usage and the applications available in the device memory 20.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A mobile device including a processor and memory, the mobile device comprising:
   a core kernel on the device configured to interface a device hardware component and a middleware component;
   at least two co-existing independent middleware operating environments on the device and coupled to the core kernel, the middleware operating environments each having a corresponding application component, wherein there are services common to the operating environments; and
   a daemon by which the two operating environments are in communication with one another.

2. The mobile device according to claim 1, wherein at least one middleware operating environment is a desktop operating environment.

3. The mobile device according to claim 1, further comprising:
   a resource manager configured to control resources shared by the at least two co-existing independent middleware operating environments.

4. The mobile device according to claim 1, wherein a resource manager controls system resources shared by the first and second independent middleware operating environments.

5. The mobile device according to claim 4, wherein the shared resources include display devices and input devices.

6. A mobile computing device comprising:
   a computer processor and a memory storage unit coupled to the computer processor, the memory storage unit having computer executable instructions capable of simultaneously operating, on the device, at least two independent operating system environments on a common kernel on the device,
   wherein the operating system environments do not exist in a virtualization or emulation scheme but rather operate on the kernel.

7. The method of claim 6, wherein there are services common to the operating system environments.

8. The device according to claim 7, wherein a first of the at least two operating system environments is optimized for mobile communication operation.

9. The device according to claim 8, wherein a second of the at least two operating system environments is optimized for desktop operation.

10. The device according to claim 8, wherein a device state dictates a primary operating system environment and a secondary operating system environment of the at least two operating system environments.

11. The device according to claim 10, wherein the primary operating system environment is a mobile communication device operating system environment when the device is operating in a mobile communication mode.

12. The device according to claim 10, wherein the primary operating system environment switches from one of the at least two operating system environments to another one of the operating system environments when a user invokes an application associated with said other one of the operating system environments.

13. The device according to claim 12, wherein the primary operating system environment switches from said other of the operating system environments to said one of the operating system environments when the device receives a phone call.

14. The device according to claim 12, wherein the primary operating system environment switches from said other of the operating system environments to said one of the operating system environments when the device is docked.

15. The device according to claim 10, wherein the device state changes in response to a phone event.

16. A mobile computing device comprising:
   a computer processor coupled to a computer memory having computer executable instructions configured to initiate an operating system wherein the operating system is configured to simultaneously run a desktop operating system environment and mobile operating system environment on a single kernel, the desktop operating system environment and the mobile operating system environment being independent, wherein there are services common to the operating system environments, wherein a first of the operating system environments includes a portal service module and a second of the operating system environments includes a resource manager, wherein the resource manager is configured to communicate directly with the portal service module, wherein the resource manager includes a set of instructions configured to manage resources shared by the first operating system environment and the second operating system environment, wherein the resources include one or more of a display device, an input device, a power management service, and system state information, and wherein the portal service module is configured to communicate directly with the resource manager, to serve as a source of communications from the first operating system environment to the resource manager.

17. The mobile computing device according to claim 16, wherein a predetermined device state dictates which of the operating system environments is a primary operating system environment and which of the operating system environments is a secondary operating system environment.

18. The mobile computing device according to claim 17, wherein the mobile operating system environment is the primary operating system environment when the device is operating in a mobile mode and the desktop operating system environment is the secondary operating system environment.

19. The mobile device according to claim 17, wherein the predetermined device state is programmable.

20. The mobile computing device of claim 16, wherein the operating system environments do not exist in a virtualization or emulation scheme but rather operate on the kernel.

21. The mobile computing device of claim 20, further comprising a daemon by which the first and second operating system environments are in communication with one another, wherein each of the portal service module and the resource manager are at least indirectly in communication with the daemon.

22. A mobile telephone comprising:
a graphical user interface configured to receive and transmit multimedia information;
a computing system comprising a processor coupled to a memory storage unit;
a multi-environment operating system having a common kernel, the memory storage unit having computer executable instructions capable of managing resources shared between first and second operating system environments that are co-existing and independent, the first and second operating system environments operating simultaneously on the common kernel and further sharing common services, wherein the first operating system environment includes a portal service module, a portal activity module, a first operating system services module, and a first operating system applications module, wherein the second operating system environment includes a resource manager, a second operating system applications module, and a second operating system services module, and a further module configured to display a first operating system environment application window on the graphical user interface at a time when the second operating system environment is serving as a primary operating system environment, wherein the kernel includes a set of drivers and an additional module that is configured to take absolute coordinate and keyboard events from the further module and pass them to an event hub, and wherein the resource manager is configured to manage at least some resources shared by the first operating system environment and the second operating system environment, to control accessing of at least some hardware by the first operating system environment and the second operating system environment, and to control at least some displaying by the graphical user interface.

* * * * *